United States Patent
Anwar (10) Patent No.: US 6,925,597 B2
(45) Date of Patent: Aug. 2, 2005

(54) SYSTEMS AND METHODS FOR DIGITAL DOCUMENT PROCESSING

(75) Inventor: Majid Anwar, Glasgow (GB)

(73) Assignee: Picsel Technologies Limited, Glasgow (GB)

( * ) Notice: Subject to any disclaimer, the term of this patent is extended or adjusted under 35 U.S.C. 154(b) by 721 days.

(21) Appl. No.: 09/835,679

(22) Filed: Apr. 16, 2001

(65) Prior Publication Data

US 2001/0044797 A1 Nov. 22, 2001

(30) Foreign Application Priority Data

Apr. 14, 2000 (GB) ............................................... 0009129

(51) Int. Cl.$^7$ ............................................... G06F 15/00
(52) U.S. Cl. ...................... 715/513; 715/523; 709/246; 717/137
(58) Field of Search ............................. 715/513, 501.1, 715/523; 707/10, 102; 709/246, 223; 717/137

(56) References Cited

U.S. PATENT DOCUMENTS

| | | | |
|---|---|---|---|
| 4,751,740 A | * | 6/1988 | Wright ........................ 382/180 |
| 5,083,262 A | | 1/1992 | Haff ............................ 703/27 |
| 5,119,465 A | * | 6/1992 | Jack et al. .................. 717/137 |
| 5,278,678 A | | 1/1994 | Harrington |

(Continued)

FOREIGN PATENT DOCUMENTS

| | | |
|---|---|---|
| EP | 0 438 194 A | 7/1991 |
| EP | 0 465 250 | 1/1992 |
| EP | 0 479 496 A | 4/1992 |
| EP | 0 513 584 A | 11/1992 |
| EP | 529 121 A | 3/1993 |
| EP | 0 753 832 A | 1/1997 |
| EP | 0 764 918 A | 3/1997 |
| EP | 0 860 769 A | 8/1998 |
| EP | 0 949 571 A2 | 10/1999 |
| GB | 2 313 277 A | 11/1997 |
| WO | WO 97/34240 | 9/1997 |
| WO | WO 98/10356 | 3/1998 |
| WO | WO 98 37506 | 8/1998 |
| WO | WO 99 10840 A | 3/1999 |
| WO | WO 00 10372 A | 3/2000 |

OTHER PUBLICATIONS

Blumberg, et al., "Visual Realism and Interactivity for the Internet", Proceedings of IEEE Compcon, 1997, San Jose, Feb. 23–26, 1997, Los Alamitos, IEEE Comp. Soc. Press, Feb. 1997, pp. 269–273.

(Continued)

Primary Examiner—Joseph Feild
Assistant Examiner—Maikhanh Nguyen
(74) Attorney, Agent, or Firm—Ropes & Gray LLP (57) ABSTRACT

Display technologies that separate the underlying functionality of an application program from the graphical display process, thereby eliminating or reducing the application's need to control the device display and to provide graphical user interface tools and controls for the display. Additionally, such systems reduce or eliminate the need for an application program to be present on a processing system when displaying data created by or for that application program, such as a document or video stream. Thus it will be understood that in one aspect, the systems and methods described herein can display content, including documents, video streams, or other content, and will provide the graphical user functions for viewing the displayed document, such as zoom, pan, or other such functions, without need for the underlying application to be present on the system that is displaying the content. The advantages over the prior art of the systems and methods described herein include the advantage of allowing different types of content from different application programs to be shown on the same display within the same work space.

41 Claims, 7 Drawing Sheets

U.S. PATENT DOCUMENTS

| | | | | |
|---|---|---|---|---|
| 5,390,320 A | | 2/1995 | Smithline | 703/20 |
| 5,504,891 A | * | 4/1996 | Motoyama et al. | 715/513 |
| 5,708,828 A | * | 1/1998 | Coleman | 715/523 |
| 5,754,348 A | | 5/1998 | Soohoo | 359/802 |
| 5,867,166 A | | 2/1999 | Shick et al. | 345/419 |
| 5,910,805 A | | 6/1999 | Haschart et al. | 345/467 |
| 5,911,066 A | | 6/1999 | Atkinson et al. | 719/310 |
| 6,034,700 A | | 3/2000 | Nickel et al. | 345/441 |
| 6,125,391 A | * | 9/2000 | Meltzer et al. | 709/223 |
| 6,336,124 B1 | * | 1/2002 | Alam et al. | 715/523 |
| 6,643,652 B2 | * | 11/2003 | Helgeson et al. | 707/10 |
| 6,717,573 B1 | | 4/2004 | Shahoian et al. | |

OTHER PUBLICATIONS

Rowe, J.H., "Metafiles and Computer Graphics", Computers and Graphics, Pergamon Press, Ltd. Oxford, Great Britain, vol. 10, No. 2, 1986, pp. 103–106.

Phelps et al. Multivalent Annotations. Proceedings of the First European Conference on Research and Advanced Technology for Digital Libraries. (1997).

Phelps et al. Multivalent Documents: Inducing Structure and Behaviors in Online Digital Documents. Proceedings of Hawaii International Conference on System Sciences (1996) (Best Paper Award, Digital Documents Track).

Phelps et al. Toward Active, Extensible, Networked Documents: Multivalent Architecture and Applications. Proceedings of ACM Digital Libraries (1996).

Phelps et al. Multivalent Documents: A New Model for Digital Documents. Technical Report, CSD–98–999 (1998).

* cited by examiner

SYSTEMS AND METHODS FOR DIGITAL DOCUMENT PROCESSING

RELATED APPLICATIONS

This application claims priority to earlier filed British Patent Application No. 0009129.8, filed 21, Apr. 2000, and U.S. patent application Ser. No. 09/703,502 filed 31, Oct. 2000, both having Majid Anwar as an inventor, the contents of which are hereby incorporated by reference.

FIELD OF THE INVENTION

The invention relates to data processing systems, and more particularly, to methods and systems for processing digital documents to generate an output representation of a source document as a visual display, a hardcopy, or in some other display format.

BACKGROUND

As used herein, the term "digital document" is used to describe a digital representation of any type of data processed by a data processing system which is intended, ultimately, to be output in some form, in whole or in part, to a human user, typically by being displayed or reproduced visually (e.g., by means of a visual display unit or printer), or by text-to-speech conversion, etc. A digital document may include any features capable of representation, including but not limited to the following: text; graphical images; animated graphical images; full motion video images; interactive icons, buttons, menus or hyperlinks. A digital document may also include non-visual elements such as audio (sound) elements.

Data processing systems, such as personal computer systems, are typically required to process "digital documents," which may originate from any one of a number of local or remote sources and which may exist in any one of a wide variety of data formats ("file formats"). In order to generate an output version of the document, whether as a visual display or printed copy, for example, it is necessary for the computer system to interpret the original data file and to generate an output compatible with the relevant output device (e.g., monitor, or other visual display device or printer). In general, this process will involve an application program adapted to interpret the data file, the operating system of the computer, a software "driver" specific to the desired output device and, in some cases (particularly for monitors or other visual display units), additional hardware in the form of an expansion card.

This conventional approach to the processing of digital documents in order to generate an output is inefficient in terms of hardware resources, software overheads and processing time, and is completely unsuitable for low power, portable data processing systems, including wireless telecommunication systems, or for low cost data processing systems such as network terminals, etc. Other problems are encountered in conventional digital document processing systems, including the need to configure multiple system components (including both hardware and software components) to interact in the desired manner, and inconsistencies in the processing of identical source material by different systems (e.g., differences in formatting, color reproduction, etc.). In addition, the conventional approach to digital document processing is unable to exploit the commonality and/or re-usability of file format components.

SUMMARY OF THE INVENTION

It is an object of the present invention to provide digital document processing methods and systems, and devices incorporating such methods and systems, which obviate or mitigate the aforesaid disadvantages of conventional methods and systems.

The systems and methods described herein provide a display technology that separates the underlying functionality of an application program from the graphical display process, thereby eliminating or reducing the application's need to control the device display and to provide graphical user interface tools and controls for the display. Additionally, such systems reduce or eliminate the need for an application program to be present on a processing system when displaying data created by or for that application program, such as a document or video stream. Thus it will be understood that in one aspect, the systems and methods described herein can display content, including documents, video streams, or other content, and will provide the graphical user functions for viewing the displayed document, such as zoom, pan, or other such functions, without need for the underlying application to be present on the system that is displaying the content. The advantages over the prior art of the systems and methods described herein include the advantage of allowing different types of content from different application programs to be shown on the same display within the same work space. Many more advantages will be apparent to those of ordinary skill in the art and those of those of ordinary skill in the art will also be able to see numerous way of employing the underlying technology of the invention for creating additional systems, devices, and applications. These modified systems and alternate systems and practices will be understood to fall within the scope of the invention.

More particularly, the systems and methods described herein include a digital content processing system that comprises an application dispatcher for receiving an input byte stream representing source data in one of a plurality of predetermined data formats and for associating the input byte stream with one of the predetermined data formats. The system may also comprise a document agent for interpreting the input byte stream as a function of the associated predetermined data format and for parsing the input byte stream into a stream of document objects that provide an internal representation of primitive structures within the input byte stream. The systems also include a core document engine for converting the document objects into an internal representation data format and for mapping the internal representation data to a location on a display. A shape processor within the system processes the internal representation data to drive an output device to present the content as expressed through the internal representation.

Embodiments of the invention will now be described, by way of example only, with reference to the accompanying drawings.

BRIEF DESCRIPTION OF THE DRAWINGS

The foregoing and other objects and advantages of the invention will be appreciated more fully from the following further description thereof, with reference to the accompanying drawings, wherein.

DETAILED DESCRIPTION OF CERTAIN ILLUSTRATED EMBODIMENTS

The systems and methods described herein include computer programs that operate to process an output stream or output file generated by an application program for the purpose of presenting the output on an output device, such as a video display. The applications according to the invention can process these streams to create an internal representation of that output and can further process that internal representation to generate a new output stream that may be displayed on an output device as the output generated by the application according to the invention. Accordingly, the systems of the invention decouple the application program from the display process thus relieving the application program from having to display its output onto a particular display device and further removes the need to have the application program present when processing the output of that application for the purpose of displaying that output.

Figure 1:
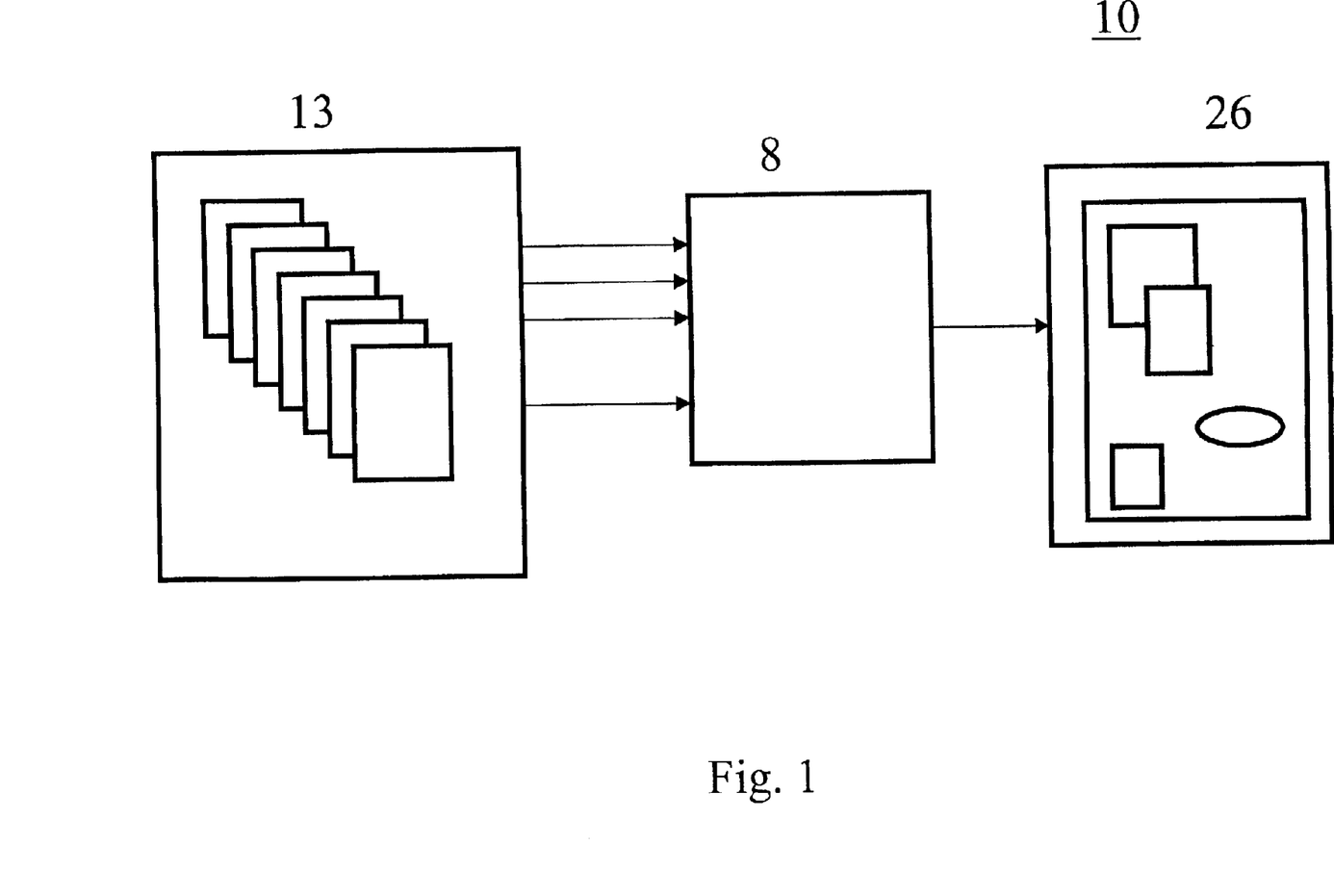
FIG. 1 is a block diagram illustrating an embodiment of a digital document processing system in accordance with the present invention.

To illustrate this operation, FIG. 1 provides a high-level functional block diagram of a system 10 that allows a plurality of application programs, shown collectively as element 13, to deliver their output streams to a computer process 8 that processes those output streams and generates a representation of the collective output created by those streams for display on the device 26. The collective output of the application programs 13 is depicted in FIG. 1 by the output printer device 26 that presents the output content generated by the different application programs 13. It will be understood by those of skill in the art the output device 26 is presenting output generated by the computer process 8 and that this output collectively carries the content of the plural application programs 13. In the illustration provided by FIG. 1, the presented content comprises a plurality of images and the output device 26 is a display. However, it will be apparent to those of skill in the art that in other practices the content may be carried in a format other than images, such as auditory tactile, or any other format, or combination of formats suitable for conveying information to a user. Moreover, it will be understood by those of skill in the art that the type of output device 26 will vary according to the application and may include devices for presenting audio content, video content, printed content, plotted content or any other type of content. For the purpose of illustration, the systems and methods described herein will largely be shown as displaying graphical content through display devices, yet it will be understood that these exemplary systems are only for the purpose of illustration, and not to be understood as limiting in anyway. Thus the output generated by the application programs 13 is processed and aggregated by the computer process 8 to create a single display that includes all the content generated by the individual application programs 13.

In the depicted embodiment, each of the representative outputs appearing on display 26 is termed a document, and each of the depicted documents can be associated with one of the application programs 13. It will be understood that the term document as used herein will encompass documents, streamed video, streamed audio, web pages, and any other form of data that can be processed and displayed by the computer process 8. The computer process 8 generates a single output display that includes within that display one or more of the documents generated from the application programs 13. The collection of displayed documents represents the content generated by the application programs 13 and this content is displayed within the program window generated by the computer process 8. The program window for the computer process 8 also may include a set of icons representative of tools provided with the graphical user interface and capable of allowing a user to control the operation, in this case the display, of the documents appearing in the program window.

In contrast, the conventional approach of having each application program form its own display would result in a presentation on the display device 26 that included several program windows, typically one for each application program 13. Additionally, each different type of program window would include a different set of tools for manipulating the content displayed in that window. Thus the system 10 of the invention has the advantage of providing a consistent user interface, and only requiring knowledge of one set of tools for displaying and controlling the different documents. Additionally, the computer process 8 operates on the output of the application programs 13, thus only requiring that output to create the documents that appear within the program window. Accordingly, it is not necessary that the application programs 13 be resident on the same machine as the process 8, nor that the application programs 13 operate in concert with the computer process 8. The computer process 8 needs only the output from these application programs 13, and this output can be derived from stored data files that were created by the application programs 13 at an earlier time. However, the systems and methods described herein may be employed as part of systems wherein an application program is capable of presenting its own content, controlling at least a portion of the display 26 and presenting that content within a program window associated with that application program. In these embodiments the systems and methods of the invention can work as separate applications that appear on the display within a portion of the display provided for its use.

More particularly, FIG. 1 depicts a plurality of application programs 13. These application programs can include word processing programs such as Word, WordPerfect, or any other similar word processing program. If can further include programs such as Netscape Composer that generates HTML files, Adobe Acrobat that processes PDF files, a web server that delivers XML or HTML, a streaming server that generates a stream of audio-visual data, an e-mail client or server, a database, spreadsheet or any other kind of application program that delivers output either as a file, data stream, or in some other format suitable for use by a computer process. In the embodiment of FIG. 1 each of the application programs 13 presents its output content to the computer process 8. In operation this can occur by having the application process 13 direct its output stream as an input byte stream to the computer process 8. The use of data streams is well known to those of ordinary skill in the art and described in the literature, including for example, Stephen G. Kochan, Programming in C, Hayden Publishing (1983). Optionally, the application program 13 can create a data file such as a Word document, that can be streamed into the computer process 8 either by a separate application or by the computer process 8.

The computer process 8 is capable of processing the various input streams to create the aggregated display shown on display device 26. To this end, and as will be shown in greater detail hereinafter, the computer process 8 processes the incoming streams to generate an internal representation of each of these input streams. In one practice this internal representation is meant to look as close as possible to the output stream of the respective application program 13. However, in other embodiments the internal representation may be created to have a selected, simplified or partial likeness to the output stream generated by the respective application program 13. Additionally and optionally, the systems and methods described herein may also apply filters to the content being translated thereby allowing certain portions of the content to be removed from the content displayed or otherwise presented. Further, the systems and methods described herein may allow alteration of the structure of the source document, allowing for repositioning content within a document, rearranging the structure of the document, or selecting only certain types of data. Similarly in an optional embodiment, content can be added during the translation process, including active content such as links to web sites. In either case, the internal representation created by computer process 8 may be further processed by the computer process 8 to drive the display device 26 to create the aggregated image represented in FIG. 1.

Figure 2:
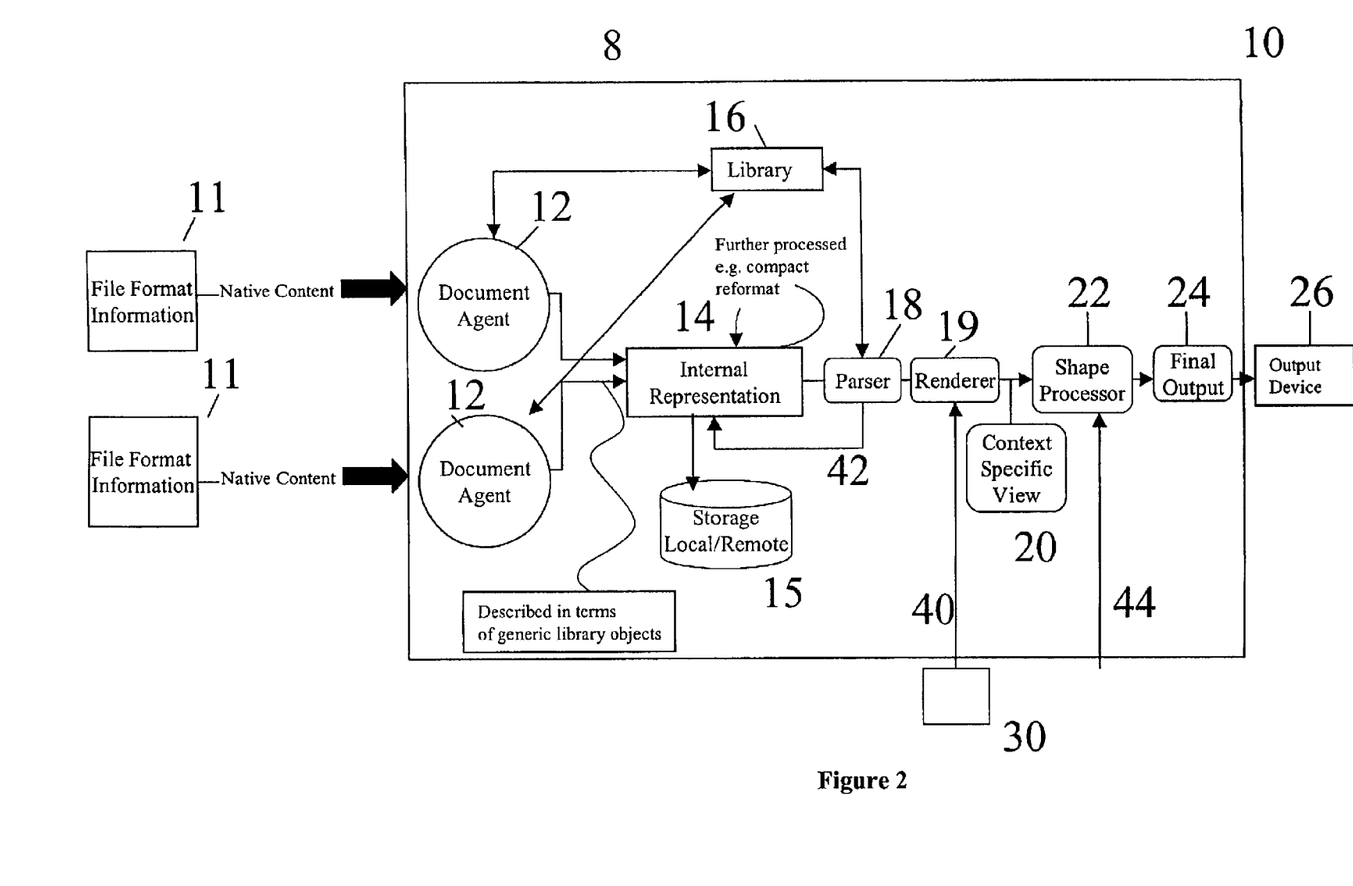
FIG. 2 is a block diagram that presents in greater detail the system depicted in FIG. 1.

Turning to FIG. 2, a more detailed representation of the system of FIG. 1 is presented. Specifically, FIG. 2 depicts the system 10 which includes that computer process 8, the source documents 11, a and a display device 26. The computer process 8 includes a plurality of document agents 12, an internal representation format file and process 14, buffer storage 15, a library of generic objects 16, a core document engine that in this embodiment comprises a parsing module 18, and a rendering module 19, an internal view 20, a shape processor 22 and a final output 24. FIG. 2 further depicts an optional input device 30 for transmitting user input 40 to the computer process 8. The depicted embodiment includes a process 8 that comprises a shape processor 22. However, it will be apparent to those of ordinary skill in the art, that the depicted process 8 is only exemplary and that the process 8 may be realized through alternate processes and architectures. For example, the shape processor 22 may optionally be realized as a hardware component, such as a semiconductor device, that supports the operation of the other elements of the process 8. Moreover, it will be understood that although FIG. 2 presents process 8 as a functional block diagram that comprises a single system, it may be that process 8 is distributed across a number of different platforms, and optionally it may be that the elements operate at different times and that the output from one element of process 8 is delivered at a later time as input to the next element of process 8.

As discussed above, each source document 11 is associated with a document agent 12 that is capable of translating the incoming document into an internal representation of the content of that source document 11. To identify the appropriate document agent 12 to process a source document 11, the system 10 of FIG. 1 includes an application dispatcher (not shown) that controls the interface between application programs and the system 10. In one practice, the use of an external application programming interface (API) is handled by the application dispatcher which passes data, calls the appropriate document agent 12, or otherwise carries out the request made by the application program. To select the appropriate document agent 12 for a particular source document 11, the application dispatcher advertises the source document 11 to all the loaded document agents 12. These document agents 12 then respond with information regarding their particular suitability for translating the content of the published source document 11. Once the document agents 12 have responded, the application dispatcher selects a document agent 12 and passes a pointer, such as a URI of the source document 11, to the selected document agent 12.

In one practice, the computer process 8 may be run as a service under which a plurality of threads may be created thereby supporting multi-processing of plural document sources 11. In other embodiments, the process 8 does not support multi-threading and the document agent 12 selected by the application dispatcher will be called in the current thread.

It will be understood that the exemplary embodiment of FIG. 2 provides a flexible and extensible front end for processing incoming data streams of different file formats. For example, optionally, if the application dispatcher determines that the system lacks a document agent 12 suitable for translating the source document 11, the application dispatcher can signal the respective application program 13 indicating that the source document 11 is in an unrecognized format. Optionally, the application program 13 may choose to allow the reformatting of the source document 11, such as by converting the source document 11 produced by the application program 13 from its present format into another format supported by that application program 13. For example an application program 13 may determine that the source document 11 needs to be saved in a different format, such as an earlier version of the file format. To the extent that the application program 13 supports that format, the application program 13 can resave the source document 11 in this supported format in order that a document agent 12 provided by the system 10 will be capable of translating the source document 11. Optionally, the application dispatcher, upon detecting that the system 10 lacks a suitable document agent 12, can indicate to a user that a new document agent of a particular type may be needed for translating the present source document 11. To this end, the computer process 8 may indicate to the user that a new document agent needs to be loaded into the system 10 and may direct the user to a location, such as a web site, from where the new document agent 12 may be downloaded. Optionally, the system could fetch automatically the document agent without asking the user, or could identify a generic agent 12, such as a generic text agent that can extract portions of the source document 11 representative of text. Further, agents that prompt a user for input and instruction during the translation process may also be provided.

In a still further optional embodiment, an application dispatcher in conjunction with the document agents 12 acts as an input module that identifies the file format of the source document 11 on the basis of any one of a variety of criteria, such as an explicit file-type identification within the document, from the file name, including the file name extension, or from known characteristics of the content of particular file types. The bytestream is input to the document agent 12, specific to the file format of the source document 11.

Although the above description has discussed input data being provided by a stream or computer file, it shall be understood by those of skill in the art that the system 10 may also be applied to input received from an input device such as a digital camera or scanner as well as from an application program that can directly stream its output to the process 8, or that has its output streamed by an operating system to the process 8. In this case the input bytestream may originate directly from the input device, rather from a source document 11. However, the input bytestream will still be in a data format suitable for processing by the system 10 and, for the purposes of the invention, input received from such an input device may be regarded as a source document 11.

As shown in FIG. 2, the document agent 12 employs the library 16 of standard objects to generate the internal representation 14, which describes the content of the source document in terms of a collection of document objects whose generic types are as defined in the library 16, together with parameters defining the properties of specific instances of the various document objects within the document. Thus, the library 16 provides a set of types of objects which the document agents 12, the parser 18 and the system 10 have knowledge of. For example, the document objects employed in the internal representation 14 may include: text, bitmap graphics and vector graphics document objects which may or may not be animated and which may be two- or three-dimensional: video, audio and a variety of types of interactive objects such as buttons and icons. Vector graphics document objects may be PostScript-like paths with specified fill and transparency. Bitmap graphic document objects may include a set of sub-object types such as for example JPEG, GIF and PNG object types. Text document objects may declare a region of stylized text. The region may include a paragraph of text, typically understood as a set of characters that appears between two delimiters, like a pair of carriage returns. Each text object may include a run of characters and the styling information for that character run including one or more associated typefaces, points and other such styling information.

The parameters defining specific instances of document objects will generally include dimensional co-ordinates defining the physical shape, size and location of the document object and any relevant temporal data for defining document objects whose properties vary with time, thereby allowing the system to deal with dynamic document structures and/or display functions. For example, a stream of video input may be treated by the system 10 as a series of figures that are changing at a rate of, for example, 30 frames per second. In this case the temporal characteristic of this figure object indicates that the figure object is to be updated 30 times per second. As discussed above, for text objects, the parameters will normally also include a font and size to be applied to a character string. Object parameters may also define other properties, such as transparency. It will be understood that the internal representation may be saved/stored in a file format native to the system and that the range of possible source documents 11 input to the system 10 may include documents in the system's native file format. It is also possible for the internal representation 14 to be converted into any of a range of other file formats if required, using suitable conversion agents.

Figure 3:
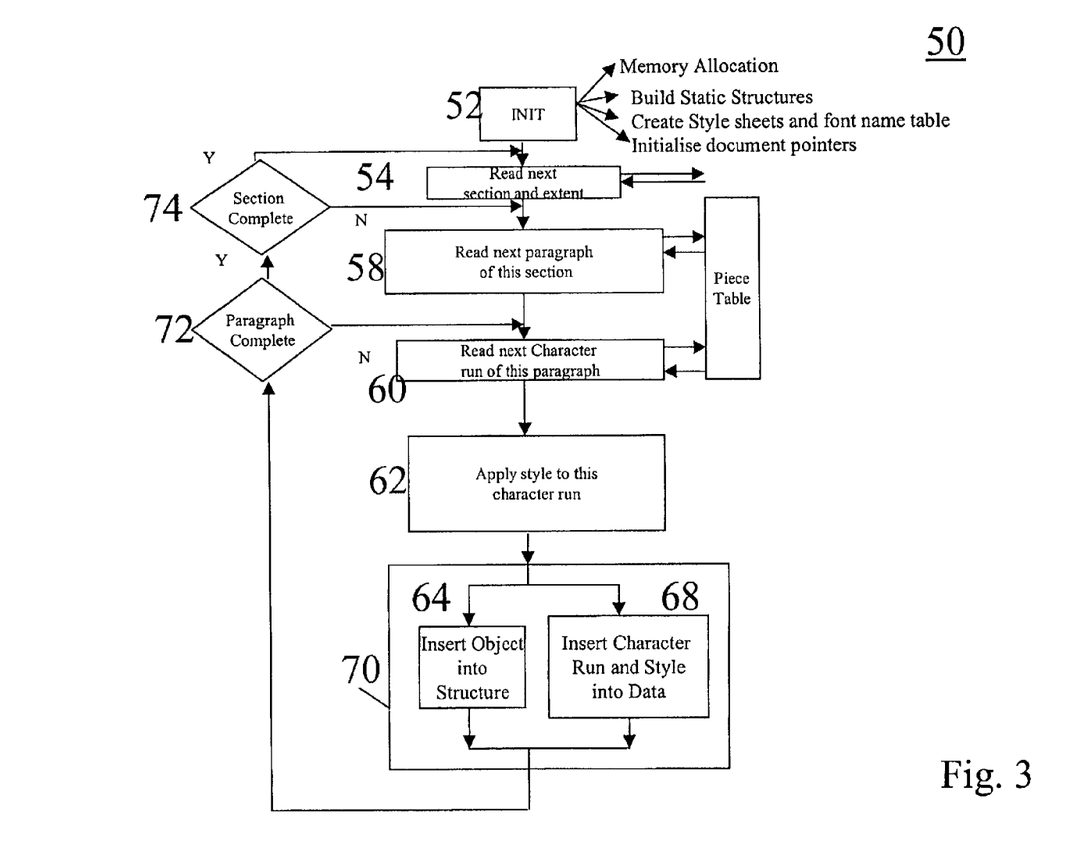
FIG. 3 is a flowchart diagram of one document agent.

FIG. 3 depicts a flow chart diagram of one exemplary process that may be carried out by a document agent 12. Specifically, FIG. 3 depicts a process 50 that represents the operation of an example document agent 12, in this case a document agent 12 suitable for translating the contents of a Microsoft Word document into an internal representation format. Specifically, the process 50 includes an initialization step 52 wherein the process 50 initializes the data structures, memory space, and other resources that the process 50 will employ while translating the source document 11. After step 52 the process 50 proceeds to a series of steps, 54, 58 and 60, wherein the source document 11 is analyzed and divided into subsections. In the process 50 depicted in FIG. 3 steps 54, 58 and 60, subdivide the source document 11 as it is streamed into the document agent 12 first into sections, then subdivides the sections into paragraphs and then subdivides paragraphs into the individual characters that make up that paragraph. The sections, paragraphs and characters identified within the source document 11 may be identified within a piece table that contains pointers to the different subsections identified within the source document 11. It will be understood by those of skill in the art that the piece table depicted in FIG. 3 represents a construct employed by MSWord for providing pointers to different subsections of a document. It will further be understood that the use of a piece table or a piece table like construct is optional and depends on the application at hand, including depending on the type of document being processed.

As the process 50 in step 60 begins to identify different characters that appear within a particular paragraph, the process 60 may proceed to step 62 wherein a style is applied to the character or set of characters identified in step 60. The application of a style is understood to associated the identified characters with a style of presentation that is being employed with those characters. The style of presentation may include properties associated with the character including font type, font size, whether the characters are bold, italic, or otherwise stylized. Additionally, in step 62 the process can determine whether the characters are rotated, or being positioned for following a curved path or other shape. Additionally, in step 62 style associated with the paragraph in which the characters occur may also be identified and associated with the characters. Such properties can include the line spacing associated with the paragraph, the margins associated with the paragraph, the spacing between characters, and other such properties.

Figure 6:
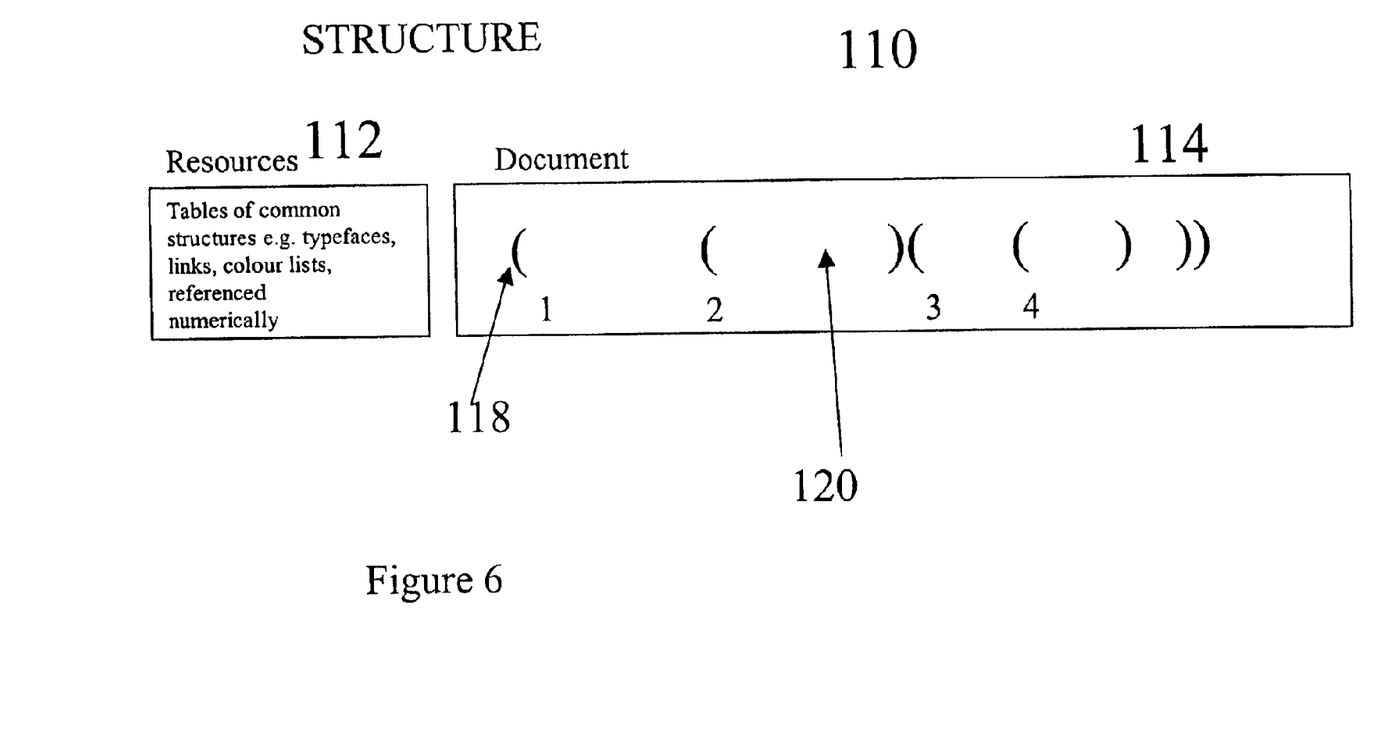
FIGS. 6–8 depict an exemplary data structure for storing an internal representation of a processed source document.
Figure 7A:
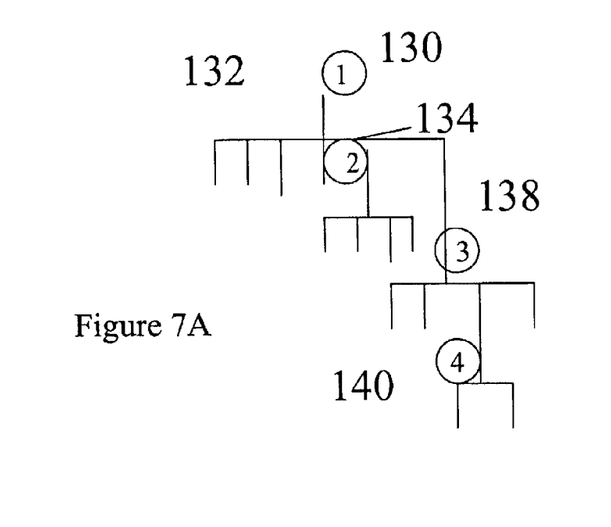
Figure 7B:
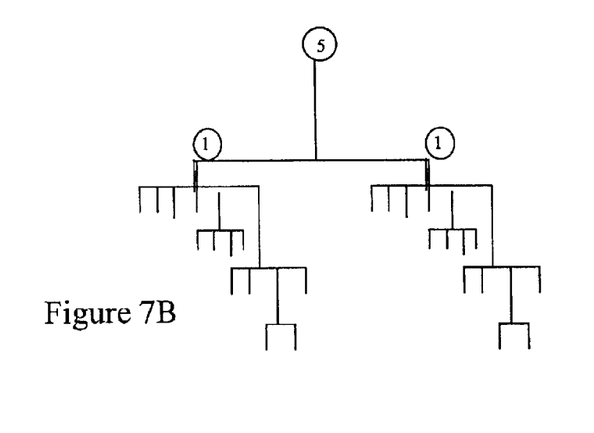
Figure 8:
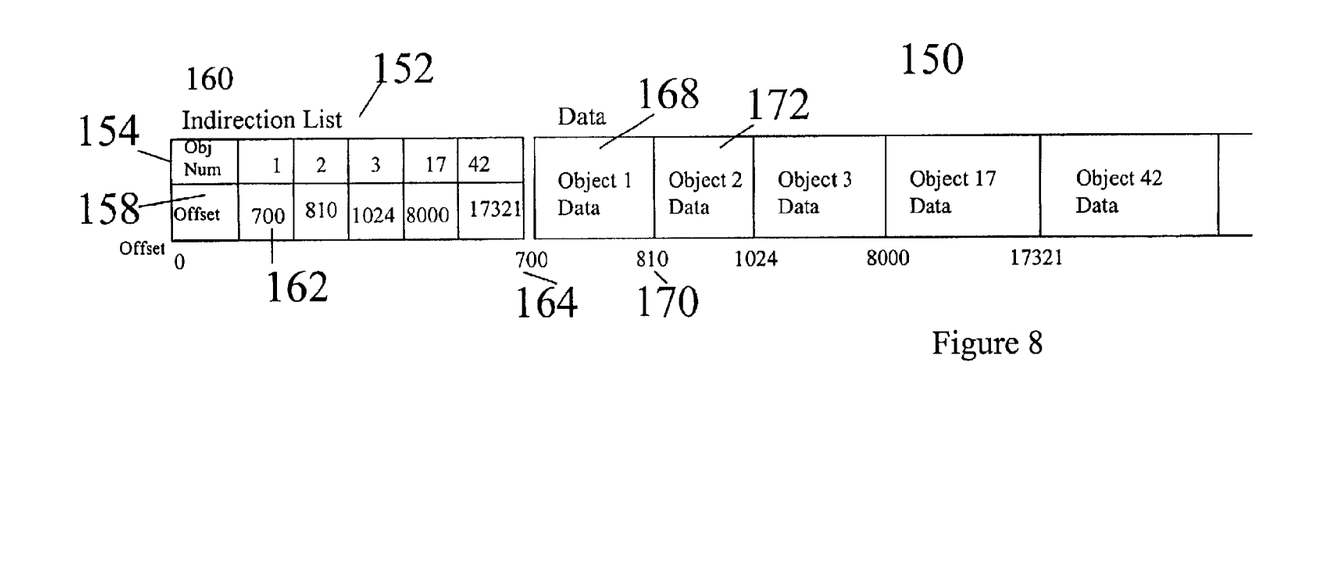

After step 62 the process 50 proceeds to step 70 wherein the internal representation is built up. The object which describes the structure of the document is created in Step 64 as an object within the internal representation, and the associated style of this object, together with the character run it contains, is created separately within the internal representation at Step 68. FIGS. 6, 7 and 8, which will be explained in more detail herein after, depict figuratively the file structure created by the process 50 wherein the structure of a document is captured by a group of document objects and the data associated with the document objects is stored in a separate data structure. After step 70, a process 50 proceeds to decision block 72 wherein the process 50 determines whether the paragraph associated with the last processed character is complete. If the paragraph is not complete the process 50 returns to step 60 wherein the next character from the paragraph is read. Alternatively, if the paragraph is complete the process 50 proceeds to decision block 74 wherein the process 50 determines whether the section is complete. If the section is complete the process returns to step 58 and the next paragraph is read from the piece table. Alternatively if the section is complete the process 50 proceeds to step 54 wherein the next section, if there is a next section is read from the piece table and processing continues. Once the document has been processed the system 8 can transmit, save, export or otherwise store the translated document for subsequent use. The system can store the translated file in a format compatible with the internal representation, and optionally in other formats as well including formats compatible with the file formats of the source documents 11 (for which it may employ 'export document agents' not shown capable of receiving internal representation data and creating source document data), or in a binary form, a textual document description structure, marked-up text or in any other suitable format; and may employ a universal text encoding model, including unicode, shiftmapping, big-5, and a luminance/chrominance model.

As can be seen from the above, the format of the internal representation 14 separates the "structure" (or "layout") of the documents, as described by the object types and their parameters, from the "content" of the various objects; e.g. the character string (content) of a text object is separated from the dimensional parameters of the object; the image data (content) of a graphic object is separated from its dimensional parameters. This allows document structures to be defined in a compact manner and provides the option for content data to be stored remotely and to be fetched by the system only when needed. The internal representation 14 describes the document and its constituent objects in terms of "high-level" descriptions.

Figure 4:
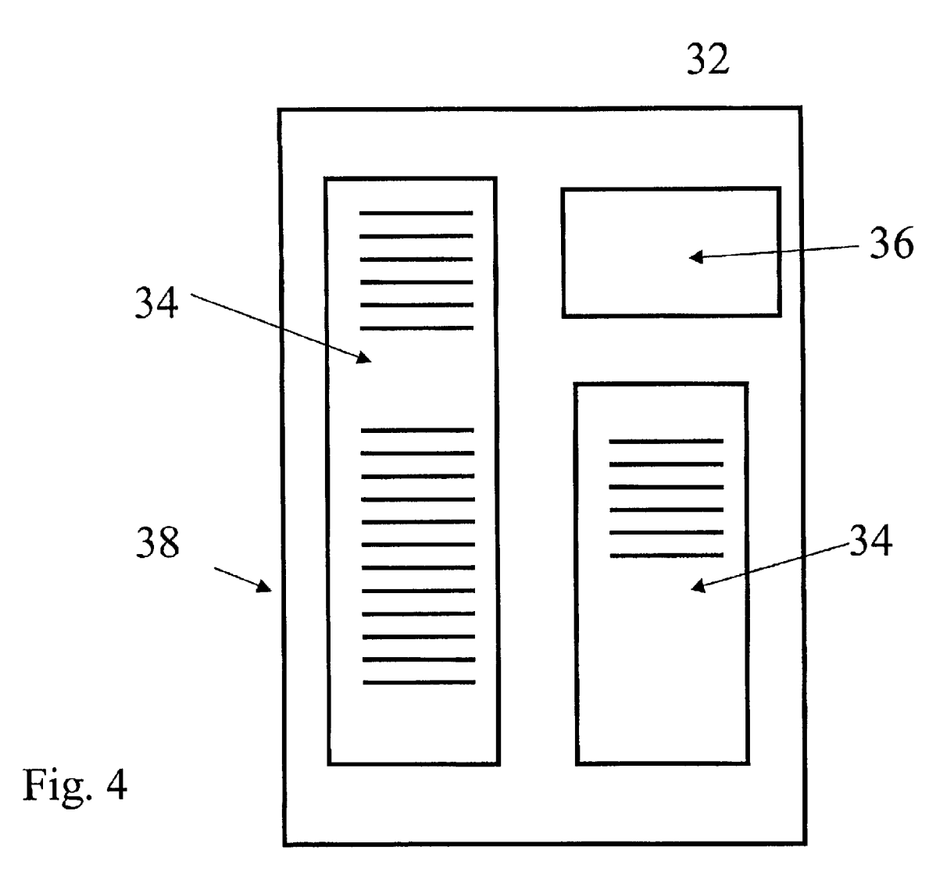
FIG. 4 depicts schematically an exemplary document of the type that can be processed by the system of FIG. 1.

The document agent 12 described above with reference to FIG. 3 is capable of processing a data file created by the MSWord word processing application and translating that data file into an internal representation that is formed from a set of object types selected from the library 16, that represents the content of the processed document. Accordingly, the document agent 12 analyzes the Word document and translates the structure and content of that document into an internal representation known to the computer process 8. One example of one type of Word document that may be processed by the document agent 12 is depicted in FIG. 4. Specifically, FIG. 4 depicts a Word document 32 of the type created by the MSWord application program. The depicted document 32 comprises one page of information wherein that one page includes two columns of text 34 and one FIG. 36. FIG. 4 further depicts that the columns of text 34 and the FIG. 36 are positioned on the page 38 in such a way that one column of text runs from the top of the page 38 to the bottom of the page 38 and the second column of text runs from about the center of the page to the bottom of the page with the FIG. 36 being disposed above the second column of text 34.

As discussed above with reference to FIG. 3 the document agent 12 begins processing the document 32 by determining that the document 32 comprises one page and contains a plurality of different objects. For the one page found by the document agent 12, the document agent 12 identifies the style of the page, which for example may be a page style of an 8.5×11 page in portrait format. The page style identified by the document agent 12 is embodied in the internal representation for later use by the parser 18 in formatting and flowing text into the document created by the process 8.

For the document 32 depicted in FIG. 4 only one page is present. However, it will be understood that the document agent 12 may process Word documents comprising a plurality of pages. In such a case the document agent 12 would process each page separately by creating a page then filling it with objects of the type found in the library. Thus page style information can include that a document comprises a plurality of pages and that the pages are of a certain size. Other page style information may be identified by the document agent 12 and the page style information identified can vary according to the application. Thus different page style information may be identified by a document agent capable of processing a Microsoft Excel document or a real media data stream.

As further described with reference to FIGS. 4 once the document agent 12 has identified the page style the document agent 12 may begin to break the document 32 down into objects that can be mapped to document objects known to the system and typically stored in the library 16. For example, the document agent 12 may process the document 32 to find text objects, bitmap objects and vector graphic objects. Other type of object types may optionally be provided including video type, animation type, button type, and script type. In this practice, the document agent 12 will identify a text object 34 whose associated style has two columns. The paragraphs of text that occur within the text object 34 may be analyzed for identifying each character in each respective paragraph. Process 50 may apply style properties to each identified character run and each character run identified within the document 32 may be mapped to a text object of the type listed within the library 16. Each character run and the applied style can be understood as an object identified by the document agent 12 as having been found within the document 32 and having been translated to a document object, in this case a text object of the type listed within the library 16. This internal representation object may be streamed from the document agent 12 into the internal representation 14. The document agent 12 may continue to translate the objects that appear within the document 32 into document objects that are known to the system 10 until each object has been translated. The object types may be appropriate for the application and may include object types suitable for translating source data representative of a digital document, an audio/visual presentation, a music file, an interactive script, a user interface file and an image file, as well as any other file types.

Figure 5A:
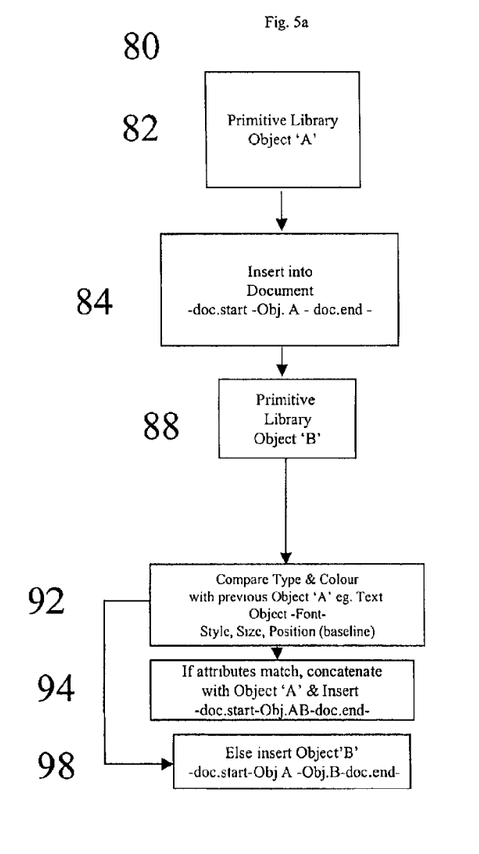
FIG. 5 depicts flowchart diagrams of two exemplary processes employed to reduce redundancy within the internal representation of a document.

Turning to FIG. 5, it can be seen that the process 80 depicted in FIG. 5 allows for compacting similar objects appearing within the internal representation of the source document 11, for the purpose of reducing the size of the internal representation. For example, FIG. 5 depicts a process 80 wherein step 82 has a primitive library object A being processed by, in step 84, inserting that primitive object into the document that is becoming the internal representation of the source document 11. In step 88 another object B, provided by the document agent 12 is delivered to the internal representation file process 14. The process 80 then undertakes the depicted sequence of steps 92 through 98 wherein characteristics of object A are compared to the characteristics of object B to determine if the two objects have the same characteristics. For example, if object A and object B represent two characters such as the letter P and the letter N, if both characters P and N are the same color, same font, same size and the same style such as bold or italicized, then the process 80 in step 94 joins the two objects together within one object classification stored within the internal representation. If these characteristics do not match then the process 80 adds them to the internal representation as two separate objects.

FIG. 5 depicts a process 80 wherein the internal representation file 14 compacts the objects as a function of the similarity of physically adjacent objects. Those of ordinary skill in the art will understand that this is merely one process for compacting the objects and that other techniques may be employed. For example, in an optional practice, the compaction process may comprise a process for compacting objects that are visually adjacent.

FIGS. 6, 7 and 8 depict the structure of the internal representation of a document that has been processed by the system depicted in FIGS. 1 and 2. The internal representation of the document may be embodied as a computer file or as data stored in core memory. However, it will be apparent to those of ordinary skill in the art that data structure selected for capturing or transporting the internal representation may vary according to the application and any suitable data structure may be employed with the systems and methods described herein without departing from the scope of the invention.

As will be described in greater detail hereinafter the structure of the internal representation of the processed document separates the structure of the document from the content of the document. Specifically, the structure of the document is captured by a data structure that shows the different document objects that make up the document, as well as the way that these document objects are arranged relative to each other. This separation of structure from content is shown in FIG. 6 wherein the data structure 110 captures the structure of the document being processed and stores that structure in a data format that is independent of the actual content associated with that document. Specifically, the data structure 110 includes a resource Table 112 and a document structure 114. The resource table 112 provides a list of resources for constructing the internal representation of the document. For example the resource table 112 can include one or more tables of common structures that occur within the document, such as type faces, links, and color lists. These common structures may be referenced numerically within the resource table 112. The resources of resource table 112 relate to the document objects that are arranged within the document structure 114. As FIG. 6 shows, the document structure 114 includes a plurality of containers 118 that are represented by the sets of the nested parentheses. Within the containers 118 are a plurality of document objects 120. As shown in FIG. 6 the containers 118 represent collections of document objects that appear within the document being processed. As further shown by FIG. 6 the containers 118 are also capable of holding sub-containers. For example, the document structure 114 includes one top-level container, identified by the set of outer parentheses labeled 1, and has three nested containers 2, 3 and 4. Additionally, the container 4 is double nested within container 1 and container 3.

Each container 118 represents features within a document, wherein the features may be a collection of individual document objects, such as the depicted document objects 120. Thus for example, a document, such as the document 32 depicted in FIG. 4, may include a container representative of the character run wherein the character run includes the text that appears within the columns 34. The different document objects 120 that occur within the character run container may, for example, be representative of the different paragraphs that occur within that character run. The character run container has a style associated with it. For example, the character run depicted in FIG. 4 can include style information representative of the character font type, font size, styling, such as bold or italic styling, and style information representative of the size of the column, including width and length, in which the character run, or at least a portion of that character run, occurs. This style information may be later used by the parser 18 to reformat and reflow the text within the context specific view 20. Another example of a container may be a table that, for example, could appear within a column 34 of text in document 32. The table may be a container with objects. The other types and uses of containers will vary according to the application at hand and the systems and methods of the invention are not limited to any particular set of object types or containers.

Thus, as the document agent 12 translates the source document 11, it will encounter objects that are of known object types, and the document agent 16 will request the library 16 to create an object of the appropriate object type. The document agent 12 will then lodge that created document object into the appropriate location within document structure 114 to preserve the overall structure of the source document 11. For example, as the document agent 12 encounters the image 36 within the source document 11, the document agent 12 will recognize the image 36, which may for example be a JPEG image, as an object of type bitmap, and optionally sub-type JPEG. This document agent 12, as shown in steps 64 and 68 of FIG. 3, can create the appropriate document object 120 and can lodge the created document object 120 into the structure 114. Additionally, the data for the JPEG image document object 120, or in another example, the data for the characters and their associated style for a character run, may be stored within the data structure 150 depicted in FIG. 8.

As the source document 11 is being processed, the document agent 12 may identify other containers wherein these other containers may be representative of a subfeature appearing within an existing container, such as a character run. For example, these subfeatures may include links to referenced material, or clipped visual regions or features that appear within the document and that contain collections of individual document objects 120. The document agent 12 can place these document objects 120 within a separate container that will be nested within the existing container. The arrangement of these document objects 120 and the containers 118 are shown in FIG. 7A as a tree structure 130 wherein the individual containers 1, 2, 3 and 4 are shown as container objects 132, 134, 138 and 140 respectively. The containers 118 and the document objects 120 are arranged in a tree structure that shows the nested container structure of documents structure 114 and the different document objects 120 that occur within the containers 118. The tree structure of FIG. 7A also illustrates that the structure 114 records and preserves the structure of the source document 11, showing the source document as a hierarchy of document objects 120, wherein the document objects 120 include the style information, such as for example the size of columns in which a run of characters appears, or temporal information, such as the frame rate for streamed content. Thus, each document's graphical structure is described by a series of parameterized elements. One example of this is presented below in Table 1.

TABLE 1

| parameters | e.g |
| --- | --- |
| Type | Bitmap |
| Bounding Box | 400, 200; 600, 700 units (bottom left, top right) |
| Fill | Object 17 |
| Alpha | 0 (none) |
| Shape | Object 24 |
| Time | 0, −1 (infinity) [start, end] |

As can be seen, Table 1 presents an example of parameters that may be used to describe a document's graphical structure. Table one presents examples of such parameters, such as the object type, which in this case is a Bitmap object type. A bounding box parameter is provided and gives the location of the document object within the source document 11. Table one further provides the Fill employed and an alpha factor that is representative of the degree of transparency for the object. A Shape parameter provides a handle to the shape of the object, which in this case could be a path that defines the outline of the object, including irregularly shaped objects. Table 1 also presents a time parameter representative of the temporal changing for that object. In this example, the image is stable and does not change with time. However, if the image object presented streamed media, then this parameter could contain a temporal characteristic that indicates the rate at which the object should change, such as a rate comparable to the desired frame rate for the content.

Thus, the structural elements are containers with flowable data content, with this flowable data held separately and referenced by a handle from the container. In this way, any or all data content can be held remotely from the document structure. This allows for rendering of the document in a manner that can be achieved with a mixture of locally held and remotely held data content. Additionally, this data structure allows for rapid progressive rendering of the internal representation of the source document 11, as the broader and higher level objects can be rendered first, and the finer features can be rendered in subsequent order. Thus, the separate structure and data allows visual document to be rendered while streaming data to "fill" the content. Additionally, the separation of content and structure allows the content of the document to readily be edited or changed. As the document structure is independent from the content, different content can be substituted into the document structure. This can be done on container by container basis or for the whole document. The structure of the document can be delivered separately from the content and the content provided later, or made present on the platform to which the structure is delivered.

Additionally, FIG. 7A shows that the structure of a source document 11 can be represented as a tree structure 130. In one practice the tree structure may be modified and edited to change the presentation of the source document 11. For example, the tree structure may be modified to add additional structure and content to the tree 130. This is depicted in FIG. 7B that shows the original tree structure of FIG. 7A duplicated and presented under a higher level container. Thus, FIG. 7B shows that a new document structure, and therefore new representation, may be created by processing the tree structure 130 produced by the document agent 12. This allows the visual position of objects within a document to change, while the relative position of different objects 120 may remain the same. By adjusting the tree structure 130, the systems described herein can edit and modify content. For example, in those applications where the content within the tree structure 130 is representative of visual content, the systems described herein can edit the tree structure to duplicate the image of the document, and present side by side images of the document. Alternatively, the tree structure 130 can be edited and supplemented to add additional visual information, such as by adding the image of a new document or a portion of that document. Moreover, by controlling the rate at which the tree structure is changed, the systems described herein can create the illusion of a document gradually changing, such as sliding across a display, such as display device 26, or gradually changing into a new document. Other effects, such as the creation of thumbnail views and other similar results can be achieved and those of ordinary skill by making modifications to the systems and methods described herein and such modified systems and methods will fall within the scope of the invention.

The data of the source document 11 is stored separately from the structure 114. To this end, each document object 120 includes a pointer to the data associated with that object and this information may be arranged within an indirection list such as the indirection list 160 depicted in FIG. 8. In this practice, and as shown in FIG. 8, each document object 120 is numbered and an indirection list 152 is created wherein each document object number 154 is associated with an offset value 158. For example the document object number 1, identified by reference number 160, may be associated with the offset 700, identified by reference number 162. Thus, the indirection list associates the object number 1 with the offset 700. The offset 700 may represent a location in core memory, or a file offset, wherein the data associated with object 1 may reside. As further shown in FIG. 8 a data structure 150 may be present wherein the data that is representative of the content associated with a respective document object 120 may be stored. Thus for example, the depicted object 1 at jump location 700 may include the unicode characters representative of the characters that occur within the character run of the container 1 depicted in FIG. 6. Similarly, the object 2 data, depicted in FIG. 8 by reference number 172, and associated with in core memory location 810, identified by reference numeral 170, may be representative of the JPEG bit map associated with a bit map document object 120 referenced within the document structure 114 of FIG. 6.

It will be noted by those of skill in the art, that as the data is separated from the structure, the content for a source document is held in a centralized repository. As such, the systems described herein allow for compressing across different types of data objects. Such processes provide for greater storage flexibility in limited resource systems.

Returning to FIG. 2, it will be understood that once the process for compacting the content of an internal representation file completes compacting different objects, these objects are passed to the parser 18. The parser 18 parses the objects identified in the structure section of the internal representation, and with reference to the data content associated with this object, it re-applies the position and styling information to each object. The renderer 19 generates a context-specific representation or "view" 20 of the documents represented by the internal representation 14. The required view may be of the all the documents, a whole document or of parts of one or some of the documents. The renderer 19 receives view control inputs 40 which define the viewing context and any related temporal parameters of the specific document view which is to be generated. For example, the system 10 may be required to generate a zoomed view of part of a document, and then to pan or scroll the zoomed view to display adjacent portions of the document. The view control inputs 40 are interpreted by the renderer 19 to determine which parts of the internal representation are required for a particular view and how, when and for how long the view is to be displayed.

The context-specific representation/view 20 is expressed in terms of primitive shapes and parameters.

The renderer 19 may also perform additional pre-processing functions on the relevant parts of the internal representation 14 when generating the required view 20 of the source document 11. The view representation 20 is input to a shape processor 22 for processing to generate an output in a format suitable fore driving an output device 26, such as a display device or printer.

The pre-processing functions of the renderer 19 may include colour correction, resolution adjustment/enhancement and anti-aliasing. Resolution enhancement may comprise scaling functions which preserve the legibility of the content of objects when displayed or reproduced by the target output device. Resolution adjustment may be context-sensitive; e.g. the display resolution of particular objects may be reduced while the displayed document view is being panned or scrolled and increased when the document view is static.

Optionally, there may be a feedback path 42 between the parser 18 and the internal representation 14, e.g. for the purpose of triggering an update of the content of the internal representation 14, such as in the case where the source document 11 represented by the internal representation comprises a multi-frame animation.

The output from the renderer 19 expresses the document in terms of primitive objects. For each document object, the representation from the renderer 19 defines the object at least in terms of a physical, rectangle boundary box, the actual outline path of the object bounded by the boundary box, the data content of the object, and its transparency.

The shape processor 22 interprets the primitive object and converts it into an output frame format appropriate to the target output device 26; e.g. a dot-map for a printer, vector instruction set for a plotter, or bitmap for a display device. An output control input 44 to the shape processor 22 provides information to the shape processor 22 to generate output suitable for a particular output device 26.

The shape processor 22 preferably processes the objects defined by the view representation 20 in terms of "shape" (i.e. the outline shape of the object), "fill" (the data content of the object) and "alpha" (the transparency of the object), performs scaling and clipping appropriate to the required view and output device, and expresses the object in terms appropriate to the output device (typically in terms of pixels by scan conversion or the like, for most types of display device or printer). The shape processor 22 optionally includes an edge buffer which defines the shape of an object in terms of scan-converted pixels, and preferably applies anti-aliasing to the outline shape. Anti-aliasing may be performed in a manner determined by the characteristics of the output device 26, by applying a grey-scale ramp across the object boundary. This approach enables memory efficient shape-clipping and shape-intersection processes, and is memory efficient and processor efficient as well. A look-up table, or other technique, may be employed to define multiple tone response curves, allowing non-linear rendering control. The individual primitive objects processed by the shape processor 22 are combined in the composite output frame. The design of one shape processor suitable for use with the systems described herein is shown in greater detail in the patent application entitled Shape Processor, filed on even date herewith, the contents of which are incorporated by reference. However, any suitable shape processor system or process may be employed without departing from the scope of the invention.

As discussed above, the process 8 depicted in FIG. 1 can be realized as a software component operating on a data processing system such as a hand held computer, a mobile telephone, set top box, facsimile machine, copier or other office equipment, an embedded computer system, a Windows or Unix workstation, or any other type of computer/processing platform capable of supporting, in whole or in part, the document processing system described above. In these embodiments, the system can be implemented as a C language computer program, or a computer program written in any high level language including C++, Fortran, Java or Basic. Additionally, in an embodiment where microcontrollers or DSPs are employed, the systems can be realized as a computer program written in microcode or written in a high level language and compiled down to microcode that can be executed on the platform employed. The development of such systems is known to those of skill in the art, and such techniques are set forth in *Intel® StrongARM processors SA-1110 Microprocessor Advanced Developer's Manual*. Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Accordingly, although FIGS. 1 and 2 graphically depicts the computer process 8 as comprising a plurality of functional block elements, it will be apparent to one of ordinary skill in the art that these elements can be realized as computer programs or portions of computer programs that are capable of running on the data processing platform to thereby configure the data processing platform as a system according to the invention. Moreover, although FIG. 1 depicts the system 10 as an integrated unit of a document processing process 8 and a display device 26, it will be apparent to those of ordinary skill in the art that this is only one embodiment, and that the systems described herein can be realized through other architectures and arrangements, including system architectures that separate the document processing functions of the process 8 from the document display operation performed by the display 26. Moreover, it will be understood that the systems of the invention are not limited to those systems that include a display or output device, but that the systems of the invention will encompass those processing systems that process one or more digital documents to create output that can be presented on an output device. However, this output may be stored in a data file for subsequent presentation on a display device, for long term storage, for delivery over a network, or for some other purpose than for immediate display. Accordingly, it will be apparent to those of skill in the art that the systems and methods described herein can support many different document and content processing applications and that the structure of the system or process employed for a particular application will vary according to the application and the choice of the designer.

From the foregoing, it will be understood that the system of the present invention may be "hard-wired"; e.g. implemented in ROM and/or integrated into ASICs or other single-chip systems, or may be implemented as firmware (programmable ROM such as flashable ePROM), or as software, being stored locally or remotely and being fetched and executed as required by a particular device. Such improvements and modifications may be incorporated without departing from the scope of the present invention.

Those skilled in the art will know or be able to ascertain using no more than routine experimentation, many equivalents to the embodiments and practices described herein. For example, the systems and methods described herein may be stand alone systems for processing source documents 11, but optionally these systems may be incorporated into a variety of types of data processing systems and devices, and into peripheral devices, in a number of different ways. In a general purpose data processing system (the "host system"), the system of the present invention may be incorporated alongside the operating system and applications of the host system or may be incorporated fully or partially into the host operating system. For example, the systems described herein enable rapid display of a variety of types of data files on portable data processing devices with LCD displays without requiring the use of browsers or application programs. Examples of portable data processing devices which may employ the present system include "palmtop" computers, portable digital assistants (PDAs, including tablet-type PDAs in which the primary user interface comprises a graphical display with which the user interacts directly by means of a stylus device), internet-enabled mobile telephones and other communications devices. This class of data processing devices requires small size, low power processors for portability. Typically, these devices employ advanced RISC-type core processors designed in to ASICs (application specific integrated circuits), in order that the electronics package is small and integrated. This type of device also has limited random access memory and typically has no non-volatile data store (e.g. hard disk). Conventional operating system models, such as are employed in standard desktop computing systems (PCs), require high powered central processors and large amounts of memory to process digital documents and generate useful output, and are entirely unsuited for this type of data processing device. In particular, conventional systems do not provide for the processing of multiple file formats in an integrated manner. By contrast, the systems described herein employ common processes and pipelines for all file formats, thereby providing a highly integrated document processing system which is extremely efficient in terms of power consumption and usage of system resources.

The system of the invention may be integrated at the BIOS level of portable data processing devices to enable document processing and output with much lower overhead than conventional system models. Alternatively, these systems may be implemented at the lowest system level just above the transport protocol stack. For example, the system may be incorporated into a network device (card) or system, to provide in-line processing of network traffic (e.g. working at the packet level in a TCP/IP system).

The systems herein can be configured to operate with a predetermined set of data file formats and particular output devices; e.g. the visual display unit of the device and/or at least one type of printer.

The systems described herein may also be incorporated into low cost data processing terminals such as enhanced telephones and "thin" network client terminals (e.g. network terminals with limited local processing and storage resources), and "set-top boxes" for use in interactive/internet-enabled cable TV systems. The systems may also be incorporated into peripheral devices such as hardcopy devices (printers and plotters), display devices (such as digital projectors), networking devices, input devices (cameras, scanners, etc.) and also multi-function peripherals (MFPs). When incorporated into a printer, the system enables the printer to receive raw data files from the host data processing system and to reproduce the content of the original data file correctly, without the need for particular applications or drivers provided by the host system. This avoids or reduces the need to configure a computer system to drive a particular type of printer. The present system directly generates a dot-mapped image of the source document suitable for output by the printer (this is true whether the system is incorporated into the printer itself or into the host system). Similar considerations apply to other hardcopy devices such as plotters.

When incorporated into a display device, such as a projector, the system again enables the device to display the content of the original data file correctly without the use of applications or drivers on the host system, and without the need for specific configuration of the host system and/or display device. Peripheral devices of these types, when equipped with the present system, may receive and output data files from any source, via any type of data communications network.

Additionally, the systems and methods described herein may be incorporated into in-car systems for providing driver information or entertainment systems, to facilitate the delivery of information within the vehicle or to a network that communicates beyond the vehicle. Further, it will be understood that the systems described herein can drive devices having multiple output sources to maintain a consistent display using modifications to only the control parameters. Examples include, but are not limited to, a STB or in-car system incorporating a visual display and print head, thereby enabling viewing and printing of documents without the need for the source applications and drivers.

From the foregoing, it will be understood that the system of the present invention may be "hard-wired"; e.g. implemented in ROM and/or integrated into ASICs or other single-chip systems, or may be implemented as firmware (programmable ROM such as flashable ePROM), or as software, being stored locally or remotely and being fetched and executed as required by a particular device.

Accordingly, it will be understood that the invention is not to be limited to the embodiments disclosed herein, but is to be understood from the following claims, which are to be interpreted as broadly as allowed under the law.

I claim:

1. A method for representing digital content, comprising the steps:

providing a plurality of document agents each adapted to translate source data in at least one of a predetermined number of formats associated with a plurality of source applications into a predetermined internal representation format which is independent of the source data format so that the internal representation may be processed to display the digital content independently of the source applications;

receiving source data representative of the digital content in one of the predetermined formats generated by a first of the plurality of source applications;

identifying a particular document agent from among said plurality of document agents that is suitable for translating the source data into said internal representation format;

using the identified document agent to translate the source data into an internal representation of the digital content, the translation including:

identifying objects that occur within the source data, for each object identified within the source data, creating a document object that represents an internal representation of the identified object and that separates the structure of the object from the data content of the object, organizing the document objects into a document structure that represents the structure of the digital content, organizing the data content of the objects into a data content structure, and providing a set of pointers that associate the document objects within the document structure with the data content stored in the data content structure.

2. A method according to claim 1, further including creating an indirection list that stores the set of pointers that associate the document objects with the data content.

3. A method according to claim 1, wherein receiving source data comprises receiving a stream of data generated from an application program.

4. A method according to claim 1, wherein receiving source data comprises receiving a stream of data generated from streaming data from an application program.

5. A method according to claim 1, wherein receiving source data comprises receiving a stream of data from a peripheral device.

6. A method according to claim 1, wherein receiving source data comprises receiving a stream of data from a plurality of sources of data.

7. A method according to claim 6, further comprising merging document objects found in first source data and second source data for building a composite document structure.

8. A method according to claim 1, wherein organizing the document objects into a document structure that represents the structure of the digital content includes filtering the document objects to select a sub set of document objects for the document structure.

9. A method according to claim 1, wherein organizing the document objects into a document structure that represents the structure of the digital content includes organizing the document objects into an arrangement that differs from the structure of the source data.

10. A method according to claim 1, wherein organizing the document objects into a document structure that represents the structure of the digital content includes adding document objects to alter the structure of the digital content.

11. A method according to claim 1, wherein organizing the data content of the objects into a data content structure, includes filtering content to select content for the internal representation.

12. A method according to claim 1, wherein organizing the data content of the objects into a data content structure includes adding content to the internal representation.

13. A method according to claim 1, further including substituting data from a first source with data from a second source by processing the pointers to rearrange the association between the data content and the document objects.

14. A method according to claim 1, further comprising compacting document objects by combining document objects having similar attributes.

15. A method according to claim 1, further including building a resource table for storing resources identified within a source of data.

16. A method according to claim 15, wherein the resources include resources selected from the group consisting of fonts, colour lists, styles and links.

17. A method according to claim 1, further comprising one of storing and delivering data content independently from the document structure.

18. A method according to claim 1, further comprising compressing the data content.

19. A method according to claim 1 further comprising encoding the data content.

20. A method according to claim 1, further comprising compressing the document structure.

21. A method according to claim 1, further comprising encoding the document structure.

22. A method according to claim 1, wherein a document object may include position information representative of a position of content within a document.

23. A method according to claim 22 wherein the position information may be one of relative position information and fixed position information.

24. A method according to claim 1, wherein the document structure defines position information representative of the location of an object relative to other objects in a document structure.

25. A method according to claim 1, wherein the document structure includes document objects having a set of defined parameters including dimensional, temporal and physical parameters.

26. A method according to claim 1, wherein a visual position for content in an internal representation is tracked separately from a structural position of that content in a document.

27. A method according to claim 1, wherein the digital content includes content selected from the group consisting of text, graphic, audio, video, interactive, script and audiovisual.

28. A method according to claim 1, further comprising exporting digital content.

29. A method according to claim 28, wherein exporting digital content includes exporting digital content in a format representative of the internal representation.

30. A method according to claim 29, wherein the format representative of the internal representation may be based on a structure selected from the group consisting of a binary data structure, a textual description, a marked-up text description, and a luminance/chrominance colour model.

31. A method according to claim 28, wherein exporting digital content includes exporting content in a format compatible with a selected known file format.

32. A method according to claim 29, wherein the format representative of the internal representation may be based on a universal text encoding model including an encoding selected from the group consisting of Unicode, shift-mapping and big-5.

33. A method according to claim 1, wherein said document objects include associated styling information.

34. A method according to claim 33, wherein said styling associated with a document text object includes font typeface, font size, whether the characters are bold, italic, or otherwise stylised.

35. A method according to claim 33, wherein said styling information includes page style information.

36. A computer readable medium having stored thereon instructions for a method comprising:

providing a plurality of document agents each adapted to translate source data in at least one of a predetermined number of formats associated with a plurality of source applications into a predetermined internal representation format which is independent of the source data format so that the internal representation may be processed to display the digital content independently of the source applications;

receiving source data representative of the digital content in one of the predetermined formats generated by a first of the plurality of source applications;

identifying a particular document agent from among said plurality of document agents that is suitable for translating the source data into said internal representation format;

using the identified document agent to translate the source data into an internal representation of the digital content, the translation including:
identifying objects that occur within the source data,
for each object identified within the source data, creating a document object that represents an internal representation of the identified object and that separates the structure of the object from the data content of the object,
organizing the document objects into a document structure that represents the structure of the digital content,
organizing the data content of the objects into a data content structure, and
providing a set of pointers that associate the document objects within the document structure with the data content stored in the data content structure.

37. A system for representing digital content, comprising:
means for translating source data received in one of a plurality of predetermined formats associated with a plurality of application programs into a predetermined internal representation format independent of the source data format so that the internal representation may be processed to display the digital content independently of said application programs, including:

means for identifying objects that occur within the source data, means for creating a document object that represents an internal representation of the identified object and that separates the structure of the object from the data content of the object for each object identified within the source data, means for organizing the document objects into a document structure that represents the structure of the digital content, means for organizing the data content of the objects into a data content structure, and means for providing a set of pointers that associate the document objects within the document structure with the data content stored in the data content structure;

an input mechanism for receiving source data in one of the predetermined formats generated by a first of the plurality of application programs and representative of the digital content; and means for identifying a particular document agent from among a plurality of document agents that is suitable for translating the source data into said internal representation format.

38. A system according to claim 37, including a means for translation capable of understanding a plurality of file formats.

39. A system according to claim 37, further comprising a set of object types representative of types of content that are present in said source data.

40. A system according to claim 39, wherein the set of object types includes a bitmap object type, a vector graphic object type, video type, animation type, button type, script and a text object type.

41. A system according to claim 37, wherein the means for translating identifies a file format from processing a characteristic selected from the group consisting of file content, file name, network type, transport mechanism, and disc type.

* * * * *